Figure 1:
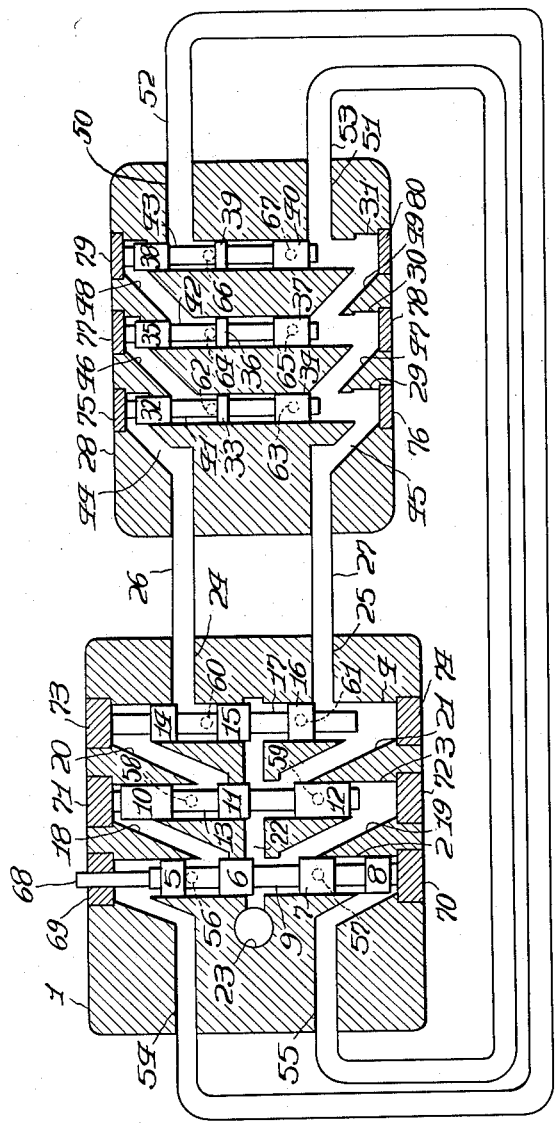

April 23, 1963  NOBUO SENSUI ET AL  3,086,614
LUBRICANT SUPPLY DEVICE

Filed Feb. 28, 1961  2 Sheets-Sheet 2

INVENTORS.
NOBUO SENSUI,
SHIGERU AOKI &
BY TADASHI YOSHIKAWA

ATTORNEY

United States Patent Office 3,086,614
Patented Apr. 23, 1963

3,086,614
LUBRICANT SUPPLY DEVICE
Nobuo Sensui, Tsurumi-ku, Yokohama-shi, Shigeru Aoki, Shibuya-ku, Tokyo-to, and Tadashi Yoshikawa, Tsurumi-ku, Yokohama-shi, Japan, assignors to Shibaura Kyodo Kogyo Kabushiki Kaisha (known as Shibaura United Engineering Co. Ltd.), Yokohama-shi, Japan
Filed Feb. 28, 1961, Ser. No. 92,212
1 Claim. (Cl. 184—7)

The present invention relates to a lubricant supply device, more particularly to a lubricant supply device wherein a combined change-over and distributing valve is disposed in a casing together with another distributing valve so that the device may be designed to be compact and to give accurate indication of the change-over operation of lubricant supply.

Conventional lubricant supply devices which have been used to supply lubricant, for instance, grease, to bearings and the like of machine tools, vehicles, etc. comprise a casing, cylinders provided in said casing in parallel and each having two lubricant outlet ports, distributing valves each comprising a tandem piston adapted to slide in each of said cylinders, and a plurality of oblique passages provided between said pistons and adapted to interconnect adjacent cylinders, said distributing valves being arranged to be successively moved in one direction by the pressure of the lubricant supplied into one of the cylinders from the outside of said casing so as to supply the lubricant through an opened lubricant outlet port of a preceding cylinder by the action of the distributing valve of the succeeding cylinder. Upon completion of supply of a predetermined quantity of lubricant, a change-over valve situated outside of the casing operates to change lubricant supply paths from one to the other and to successively move said distribution valves in the opposite direction to supply lubricant to the desired portions through lubricant outlet ports which are open at that time.

Thus, in such prior lubricant supply devices comprising a separate distributing valve and a change-over valve, as described above, it is necessary to provide, in addition to a pipe which interconnects the distributing valve and machine parts requiring lubricant supply, another pipe pipe which interconnects said pipes and the change-over valve, so that pipe arrangement becomes complicated and expensive.

Furthermore, in such lubricant supply devices as described above, it is necessary to provide a separate indicator which is associated with the change-over valve and adapted to indicate the state of change-over operation.

Accordingly, it is the principal object of this invention to dispose in the same casing a change-over valve which can effect the same function as the distributing valve together with another distributing valve.

Another object of this invention is to provide for said change-over valve an indicating rod capable of easily and accurately indicating the state of changing over of the lubricant paths.

Still another object of this invention is to provide in the casing a lubricant supply port so as to alternately connect said lubricant supply port with the conduit in another distributing valve by the action of the combined change-over and distributing valve.

A further object of this invention is to simplify the construction of the lubricant supply device by connecting the last cylinder with the first cylinder containing the combined change-over and distributing valve.

Briefly stated, the present invention can be practiced by providing a plurality of spaced parallel cylinders in a casing, each of said cylinders being provided with a pair of vertically or axially spaced lubricant outlet ports at substantially the middle portion thereof. In the first cylinder, there is arranged a combined change-over and distributing valve including a plurality of axially spaced pistons which are connected in tandem by a piston rod projecting outwardly through the casing to provide an indicator, said valve acting not only to distribute lubricant to the desired portions, but also to change the lubricant paths from one to the other. In each of the second and succeeding cylinders, there is disposed a distributing valve including a plurality of axially spaced pistons connected in tandem. Between adjacent cylinders, there is a pair of oblique lubricant conduits with one end connected with the opposite ends of the succeeding cylinder and the other end with substantially the middle portion of the preceding cylinder and the central portions of all cylinders are connected with a lubricant supply port via another lubricant conduit which is selectively connected with one of said oblique lubricant conduits by the action of the pistons of said combined change-over and distributing valve and of said distributing valve. When one of the distributing valve is operated to its upper or lower position, the lubricant contained therein is supplied to the desired portion such as a bearing or moving part of a machine through a lubricant outlet port of the preceding cylinder and one of the oblique conduits while at the same time the lubricant under pressure is introduced into one end of the succeeding cylinder to force the distributing valve contained therein in the same direction. In this manner, the distributing valves in the successive cylinders are successively operated to supply lubricant to the desired portion through the lubricant outlet opening of a preceding cylinder. Two axially spaced points located at substantially the central portion of the last cylinder are respectively connected with the opposite ends of the first cylinder through pipe lines located outside the casing so that the lubricant under pressure will be supplied from the last cylinder to that end of the first cylinder towards which the combined change-over and distributing valve was formerly moved whereby to move it in the opposite direction to change-over the lubricant paths. Thereafter, the distributing valves in the second and succeeding cylinders will successively move in the opposite direction to supply lubricant through the other lubricant outlet port of the preceding cylinder. When the distributing valve in the last cylinder operates, lubricant under pressure will be supplied to the opposite end of the first cylinder to again change the lubricant paths from one to other, thus commencing another cycle of lubricant supply. This cycle of operation will continue as long as a supply of lubricant under pressure to said supply port is maintained. As the combined change-over and distributing valve reciprocates in the first cylinder, the projecting portion of its piston rod, or the indicating rod will project from or retract into the casing, thus indicating the lubricant path which is in use.

If desired, in the pipe lines interconnecting the first and last cylinder, a second casing including any desired number of stages of the distributing valve of the same construction as those contained in the first casing may be connected in series.

Figure 2:
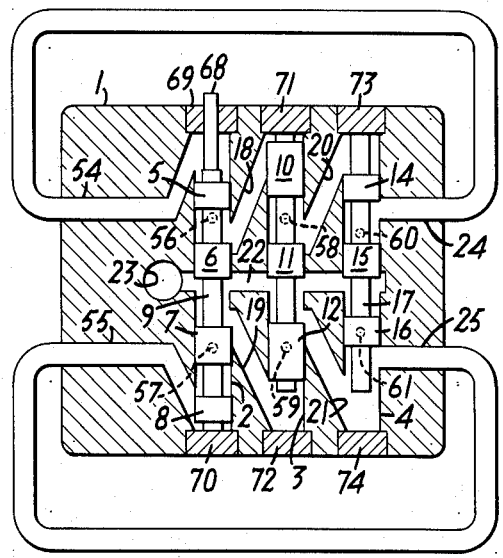

Further objects and advantages of this invention can be better understood from the following description taken in connection with the accompanying drawing wherein:

FIG. 1 is a longitudinal cross-section of a lubricant supply device embodying this invention; and FIG. 2 is a similar view of another embodiment of the invention.

Referring to FIG. 1 of the accompanying drawing, a casing 1 is provided with a plurality of spaced parallel cylinders 2, 3 and 4, the cylinder 2 serving to receive therein a combined change-over and distributing valve while the cylinders 3 and 4 contain distributing valves. The combined change-over and distributing valve in the cylinder 2 comprises four axially spaced pistons 5, 6, 7 and 8 which are connected in tandem by a common piston rod 9. Similarly in the cylinders 3 and 4 there are disposed distributing valves comprising, respectively, three pistons 10, 11 and 12 connected in tandem by a piston rod 13 and three pistons 14, 15 and 16 connected in tandem by a piston rod 17. The cylinders 2 and 3 are interconnected by a pair of oblique lubricant conduits 18 and 19. Thus, the lubricant conduit 18 extends between the upper end of the cylinder 3 and a substantially middle portion of the cylinder 2 while the lubricant conduit 19 extends between the lower end of the cylinder 3 and a substantially middle portion of the cylinder 2. Similarly, the cylinders 3 and 4 are interconnected by like oblique lubricant conduits 20 and 21. The central portion of the cylinders 2 and 3 are interconnected by a lubricant conduit 22 which is connected to a lubricant supply port 23 provided in the lefthand side wall of the casing 1.

When, as shown in FIG. 1, the change-over valve in the cylinder 2 is in its lower position and the distributing valve in the cylinder 3 is in its upper position, the conduit 22 is placed in communication with the conduits 19 and 21, but the other conduits 18 and 20 are interrupted from communication with said conduit 22 by pistons 6 and 11. The cylinder 4 is provided with a pair of vertically spaced lubricant conduits 24 and 25 passing through the righthand side wall of the casing 1, which are connected with the casing 28 of the other distributing valve via pipes 26 and 27 located outside the casing.

The general construction of the distributing valve 28 is as follows:

Like the casing 1, a plurality of spaced parallel cylinders 29, 30 and 31 are provided in the casing 28, each cylinder containing a distributing valve respectively comprising three pistons 32, 33 and 34; 35, 36 and 37; 38, 39 and 40 connected in tandem by piston rods 41, 42 and 43, respectively. A pair of oblique lubricant conduits 44 and 45 are disposed in the lefthand side wall of the casing 28, said conduits being, at one end, connected, respectively, to the opposite ends of the cylinder 29 and at their other end, connected, respectively, to the pipes 26 and 27. Pairs of like oblique lubricant conduits 46, 47 and 48, 49 interconnect adjacent cylinders 29, 30 and 30, 31, respectively. A pair of lubricant conduits 50 and 51 are provided in the righthand wall of the casing 28 with the right ends of said conduits 50 and 51 being connected, respectively, with the conduits 54 and 55 in the casing 1 through pipes 52 and 53.

Each of said cylinders 2, 3, 4, 29, 30 and 31 is provided with a pair of spaced lubricant outlet ports 56, 57, 58, 59; 60, 61; 62, 63; 64, 65; and 66, 67 adapted to be selectively opened or closed by the action of the respective associated distributing valve as will be more fully explained later.

In the illustrated embodiment the combined change-over and distributing valve embodying this invention is shown as being combined with a well known distributing valve, but it should be understood that this invention is not limited to such particular arrangement and may be carried out without the additional distributing valve. In such case, pipes 26 and 27 are directly connected with the lubricant conduits 54 and 55, as shown in FIG. 2.

According to one feature of this invention, said combined change-over valve and distributing valve is provided with an indicating rod 68 which projects outwardly through the wall of the casing 1 so that the state of lubricant supply can be known from the outside. The opposite ends of each of the cylinders are closed by blind lids or plugs 69, 70; 71, 72; 73, 74; 75, 76; 77, 78 and 79, 80 and the plug 69 has an aperture through which said indicating rod 68 reciprocates.

The operation of the lubricant supply device according to this invention is as follows:

Lubricant such as grease is supplied under pressure through the lubricant supply port 23 by means of a grease gun or any other suitable device (not shown). When the distributing valve in the cylinder 2 is in the position shown in the drawing, the conduits 22 and 19 are opened in the cylinder 2 between the pistons 6 and 7 to supply lubricant under pressure to the lower side of the pistons 11 and 12 to drive the distributing valve in the cylinder 3 to the upper position shown in the drawing. By this upward movement lubricant contained in the cylinder 3 above the piston 10 is displaced thereby to be supplied to the required portion through the conduit 18 and the lubricant outlet port 56 of the cylinder 2.

As a result of said upward movement of the distributing valve in the cylinder 3, the conduit 22 will be placed in communication with the conduit 21 and the lubricant outlet port 58 will be opened between the pistons 10 and 11. Thus, the lubricant under pressure will be supplied to the underside of the piston 16 via the conduits 22 and 21 to move upward the distributing valve in the cylinder 4. Accordingly, the lubricant contained in this cylinder above the piston 14 will be displaced and supplied to the desired portion through the conduit 20 and lubricant outlet port 58 which is opened between the pistons 10 and 11 at that time. When the distributing valve in the cylinder 4 moves upwardly, the lubricant conduit 21 will be connected to the conduit 25 while the lubricant outlet port 60 will be opened between the pistons 14 and 15. Then the lubricant in the lower portion of the cylinder 4 will be introduced into the lower portion of the cylinder 29 of the next stage through the conduit 25, pipe line 27 and conduit 45 to move upwardly the distributing valve in the cylinder 29 to supply the lubricant above the piston 32 to the desired portion via the conduit 44, pipe line 26, conduit 24 and the lubricant outlet port 60 of the cylinder 4.

When the distributing valve in the cylinder 29 moves upwardly, the lubricant outlet port 62 will be opened between the pistons 32 and 33 and the lubricant conduit 47 will be opened by the piston 34. Now, the lubricant under pressure in the lower portion of the cylinder 29 will be supplied into the lower portion of the cylinder 30 via the conduit 47, the distributing valve to move upwardly in the latter cylinder whereby the lubricant above the piston 35 is supplied to the desired portion through the conduit 46 and the lubricant outlet port 62 which is now opened between the pistons 32 and 33.

When the distributing valve in the cylinder 30 moves upwardly, the lubricant outlet port 64 will be opened between the pistons 35 and 36 and the conduit 49 will be opened by the piston 37. In the same manner as described hereinabove, the distributing valve contained in the cylinder 31 will be moved upwardly to supply the lubricant above the piston 38 to the desired portion through the conduit 48 and the lubricant outlet port 64. When the distributing valve in the cylinder 31 comes to its upper position, the lubricant outlet port 66 of said cylinder will be opened between the pistons 38 and 39 while the lubricant passage 51 and the pipe 53 will be placed in communication with the cylinder 31. Accordingly, the lubricant under pressure will be introduced into the lower portion of the cylinder 2 via the pipe 53 and conduit 55 to raise the combined change-over and distributing valve in this cylinder 2 to supply the lubricant above the piston 5 to the desired portion via the conduit 54, pipe 52, conduit 50 and lubricant outlet port 66.

As the combined change-over and distributing valve moves upwardly, the indicating rod 68 projects out of the casing 1 to indicate that changing-over of the lubricant passages has been completed. At the same time, the lubricant conduit 19 will be cut off from the conduit 22 by the piston 7 whereas the conduit 18 will be opened between the pistons 6 and 7 to communicate with the conduit 22. The lubricant outlet port 56 will be closed by the piston 6 while the lubricant outlet port 57 will be opened between the pistons 7 and 8.

By reason of the above described operation, bearings and the like parts which require an intermittent supply of lubricant are supplied with an adequate quantity of lubricant. Assuming that the supply of lubricant under pressure from the supply port 23 continues, the lubricant will be introduced into the upper portion of the cylinder 3 via the oblique conduit 18 to force downwardly the distributing valve in the cylinder 3 whereby the lubricant below the piston 12 is supplied to the desired portion via the conduit 19 and the lubricant outlet port 57. When the distributing valve in the cylinder 3 moves downwardly the conduit 21 will be cut off from the conduit 22 by the piston 11 and the conduit 20 will be connected with the conduit 22 to force downwardly the distributing valve in the cylinder 4 to supply the lubricant contained in the lower portion of this cylinder to the desired portion via the conduit 21 and the lubricant outlet port 59 which is now open between pistons 11 and 12.

As the distributing valve in the cylinder 4 moves downwardly, the lubricant outlet port 60 will be closed by the piston 14 and the conduit 24 connected with the conduit 20 and at the same time the lubricant outlet port 61 will be opened between the pistons 15 and 16. Consequently the lubricant under pressure will be supplied into the upper portion of the cylinder 29, in the casing 28 and the distributing valves in cylinders 29, 30 and 31 of this casing will sequentially be moved downwardly to supply lubricant through the lubricant outlet port belonging to the preceding cylinder.

When the distributing valve in the final cylinder 31 moves downwardly the lubricant under pressure will be supplied to the upper portion of the cylinder 2 via the pipe 52 and lubricant conduits 50 and 54 to force downwardly the combined change-over and distributing valve to the position shown in the drawing whereby the lubricant in the lower portion of the cylinder 2 will be expelled through the lubricant outlet port 67, the pipe 53 and conduits 55 and 51.

By the above operation, the supply of lubricant to all desired portions, or bearings and the like is completed and the indicating rod 68 will be returned to the retracted position to indicate that the lubricant paths have been changed-over.

As will be clearly noted from the foregoing description, in accordance with this invention, a combined distributing and change-over valve as well as other distributing valves are disposed in a common casing and moreover an indicating rod is provided for said change-over valve so that not only the lubricant supply device can be made more compact than prior devices, but also it is possible to give an accurate indication of the state of lubricant supply.

While this invention has been shown and described in connection with a particular embodiment, it should be understood that this invention is not limited to the particular construction but may be modified in various ways without departing from the true spirit thereof.

What we claim as new and desire to secure by Letters Patent of the United States is:

A lubricant supply device comprising, in combination, a casing, a plurality of spaced parallel cylinders disposed in said casing, said cylinders including a first cylinder and a plurality of succeeding cylinders, a lubricant supply port having a discharge opening at substantially the central portion of the first cylinder, a central lubricant conduit for connecting the central portion of each cylinder with said lubricant supply port, a first pair of oblique lubricant conduits between said first cylinder and the adjacent cylinder and second pairs of oblique lubricant conduits between said plurality of succeeding cylinders, first ends of said oblique conduits being in communication with the opposite ends of a succeeding cylinder while the second ends of said oblique conduits are in communication with the central portion of the cylinder from which they extend, and are thereby adapted to communicate with said central lubricant conduit, a pair of spaced lubricant outlet ports provided in each cylinder, said outlet ports being disposed adjacent said second ends of said oblique conduits, conduit means interconnecting the last of said succeeding cylinders and the opposite ends of the first cylinder, a combined change-over and distributing valve disposed in said first cylinder, said combined change-over and distributing valve in the first cylinder comprising four axially spaced pistons, distributing valves disposed in each of the succeeding cylinders, each of said distributing valves comprising three axially spaced pistons, said combined change-over and distributing valve acting to connect selectively one of said first pair of oblique lubricant conduits leading to the succeeding cylinder with said lubricant conduit leading to said lubricant supply port while connecting one of said lubricant outlet ports with the other of said first pair of oblique lubricant conduits, and each of said distributing valves in the succeeding cylinders acting to connect selectively one member of said second pairs oblique lubricant conduits leading to the succeeding cylinder with said lubricant conduit leading to said lubricant supply port while connecting one member of said second pairs lubricant outlet ports with the other of said oblique conduits.

References Cited in the file of this patent

UNITED STATES PATENTS

| | | |
|---|---|---|
| 2,146,424 | Dirkes | Feb. 7, 1939 |
| 2,834,433 | Higgens | May 13, 1958 |
| 3,025,929 | Robson et al. | Mar. 20, 1962 |

FOREIGN PATENTS

| | | |
|---|---|---|
| 747,040 | Great Britain | Mar. 28, 1956 |